Figure 1:
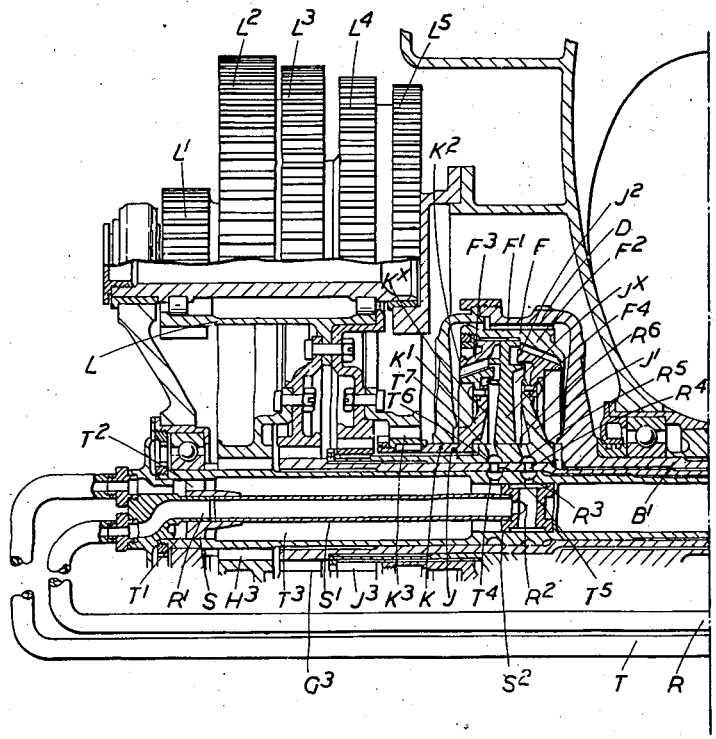

May 19, 1942.  F. B. HALFORD ET AL  2,283,434
VARIABLE RATIO TRANSMISSION MECHANISM
Filed Dec. 15, 1941   2 Sheets-Sheet 1

INVENTORS
Frank B. Halford
BY Benjamin W. Barlow
ATTORNEYS

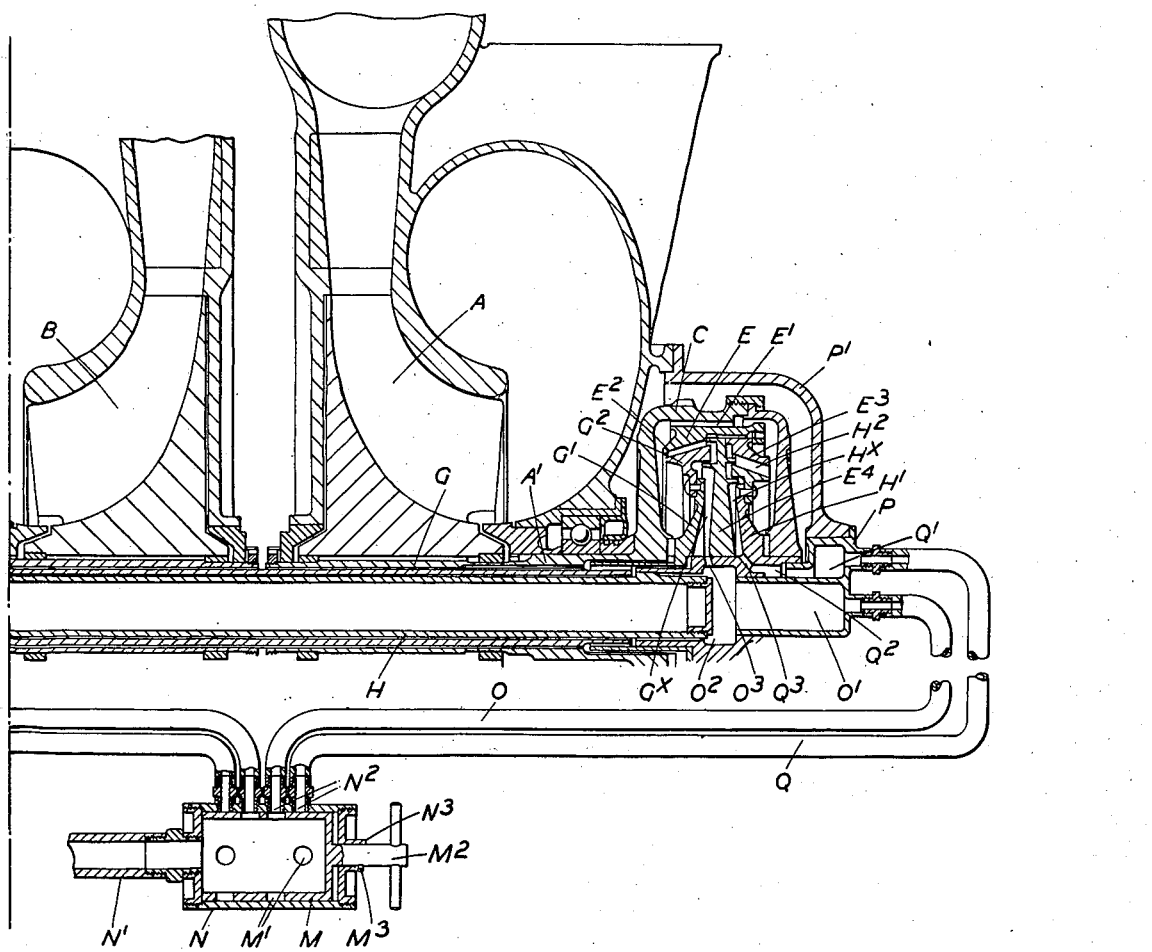

Patented May 19, 1942

2,283,434

UNITED STATES PATENT OFFICE 2,283,434

VARIABLE RATIO TRANSMISSION MECHANISM

Frank Bernard Halford, Edgware, and Benjamin William Barlow, London, England, assignors to D. Napier & Son Limited, London, England, a company of Great Britain Application December 15, 1941, Serial No. 423,122 In Great Britain November 6, 1940

7 Claims. (Cl. 230—114)

This invention relates to variable ratio transmission mechanism in which liquid under pressure is utilised to engage alternatively certain clutch members by means of which the impeller of a supercharger for an internal combustion engine can be driven at different speeds.

According to this invention there are employed in combination four gear wheels all differing in size and fixed on a driving shaft, a corresponding number of pinions of different sizes with which these gear wheels are respectively in mesh, four concentric shaft members on which these pinions are severally mounted, separate impellers of a supercharger with a double clutch coupling member connected to each impeller, clutch coupling members connected respectively to the said concentric shaft members and grouped in pairs with the clutch members in each pair cooperating separately with the double clutch member of an impeller, and hydraulic means for effecting the engagement and disengagement of the several shaft clutch members and the impeller clutch members with which they cooperate. The impellers are respectively mounted on hollow shafts which are coaxial and each shaft has a double clutch member connected to it. Of the four concentric pinion-carrying shaft members two of them pass right through both the impeller shafts each of these shafts having thereon towards one end a disc on which is a clutch member and towards the other end the pinion through which the shaft is driven. Each double clutch coupling member is carried on and connected to an impeller shaft so that the clutch member can slide in the axial direction in relation to its shaft, the preferred arrangement being to mount the two clutch members on an annulus which can slide within but must rotate with a casing which is suitably mounted on the hollow shaft of an impeller. The annulus has a partition which extends radially inwards from it this partition lying between discs which carry clutch members and are mounted on the concentric shafts through which the impeller is alternatively driven. Liquid is admitted to the spaces between the partition and these clutch discs and pressure from this liquid causes the annulus to slide and thereby effect the engagement or disengagement of the clutches.

By causing the engagement in certain defined relations of the clutch coupling members associated with the separate impellers, it is not only possible to vary the transmission ratio with respect to each individual impeller, but the speed ratio between the individual impellers can be altered, thus varying the effect of the stages of the compressor or supercharger.

The liquid by means of which the pressure is applied to engage the clutch couplings and by which their operation is controlled passes conveniently to the several clutch members through the annular spaces between the concentric shafts associated with the clutches and the impellers, and through the innermost of those shafts which is conveniently formed hollow. The flow to the several clutch couplings may be controlled by a rotatable multi-way cock. For example such a cock may comprise a hollow cylindrical member into which passes the liquid under pressure, passages or ports being formed in the wall of this cylinder which as it is rotated can be caused to register successively with ports leading to a series of passages through which the liquid can pass to those channels through which it can flow to and bring into operation the several clutch couplings.

The source of supply of this liquid may vary, but may conveniently be the pressure supply of lubricant to the engine. If desired, however, separate means may be employed for delivering the liquid and creating and maintaining the necessary pressure. This pressure may be due to centrifugal force acting on the liquid in the clutch enclosing casings.

While the constructional details may be modified as found desirable, the accompanying drawings illustrate somewhat diagrammatically and in longitudinal part sectional elevation and by way of example how the invention may be carried out in practice.

In the construction shown there are two impellers A and B which function for the two stages of a supercharging compressor or blower. In this arrangement the impellers are placed side by side, coaxially, and closely adjacent with the clutch mechanisms by means of which they are respectively driven disposed on the outside of the impeller-enclosing casings and on the end portions of the shafting on which the impellers are respectively mounted. The impeller A is mounted on a hollow shaft $A^1$ on the outer end of which is carried a casing C. The impeller B is similarly mounted on a hollow shaft $B^1$ on the end of which is fixed a casing D. Within the casing C is an annulus E which is so connected to the casing at $E^1$ that it must rotate therewith and can slide relatively to the casing in the direction of the common axis of the apparatus. Inside the annulus are mounted two oppositely directed cone clutch members $E^2$ and $E^3$ constituting a double clutch coupling and between these members and extending radially inwards from and rotatable with the annulus is a partition $E^4$.

The casing D contains a similar arrangement, namely an annulus F connected to the casing D at $F^1$ so that the annulus must rotate with the casing, but can slide relatively thereto. Within this annulus are two oppositely directed cone clutch members $F^2$ and $F^3$ and between them a partition $F^4$, the clutch members constituting a double clutch coupling through which the impeller B can be driven.

A hollow shaft G which is rotatable within the impeller shafts $A^1$ $B^1$ extends right through these shafts and carries at one end a disc $G^1$ on which is a clutch member $G^2$ adapted to engage the clutch member $E^2$ on the annulus E. On the other end of this hollow shaft is a pinion $G^3$. Rotatable within and extending through the hollow shaft G is another hollow shaft H on the one end of which is a disc $H^1$ carrying a clutch member $H^2$ adapted to engage the clutch member $E^3$ carried by the annulus E. On the other end of this shaft H is a pinion $H^3$. Rotatable upon one end portion of the shaft G is a short shaft member J on one end of which within the casing D is a disc $J^1$ carrying a clutch member $J^2$ adapted to engage the clutch member $F^2$ within the annulus F. On the other end of this shaft J is a pinion $J^3$. Rotatable on the shaft J is a short shaft length K on one end of which within the casing D is a disc $K^1$ which carries a clutch member $K^2$ adapted to engage the clutch member $F^3$ within the annulus F. On the other end of the shaft K which lies outside the casing D is a pinion $K^3$.

On a layshaft L is a pinion $L^1$ through which this shaft can be driven, and four gear wheels of different sizes $L^2$, $L^3$, $L^4$ and $L^5$. The gear wheel $L^2$ meshes with the pinion $H^3$ on the shaft H, the gear wheel $L^3$ meshes with the pinion $G^3$ on the shaft G, the gear wheel $L^4$ meshes with the pinion $J^3$ on the shaft J, and the gear wheel $L^5$ meshes with the pinion $K^3$ on the shaft K. Thus from the layshaft L the drive is transmitted simultaneously to the four concentric shafts G, H, J and K and so to the clutch discs $G^1$, $H^1$, $J^1$ and $K^1$ carried on these shafts. This drive will not be transmitted to the impeller A until the clutch member $G^2$ or the clutch member $H^2$ has been brought into engagement with one or the other of the double clutch members $E^2$ or $E^3$ which will occur when the annulus E is caused to slide in one direction or the other. Similarly the drive will not be transmitted to the impeller B until the double clutch member $F^2$ $F^3$ has been engaged either by the clutch member $J^2$ or by the clutch member $K^2$ as a result of sliding the anulus F in one direction or the other. This sliding of the annulus E and of the annulus F is effected by hydraulic pressure the liquid being admitted either into the space $H^x$ between the clutch disc $H^1$ and the partition $E^4$, or into the space $G^x$ between the clutch disc $G^1$ and the partition $E^4$. In the same way liquid can be admitted to the space $J^x$ between the partition $F^4$ and the clutch disc $J^1$, or into the space $K^x$ between the partition $F^4$ and the clutch disc $K^1$.

The liquid which thus controls the clutch couplings may act for example by pressure due to centrifugal force when the liquid is allowed to flow into one or other of the spaces indicated. Alternatively the liquid may be supplied under pressure, its flow to and from the spaces in which it is operative being suitably controlled.

In the present arrangement the liquid flow is controlled by a cock M rotatable within a casing N into the interior of which and into the cock M the liquid can flow from a pipe $N^1$. In the cock are ports $M^1$ suitably situated in relation to ports $N^2$ in the casing from which lead delivery pipes.

The flow of liquid within the casing N to the several spaces in which it is operative takes place through the following channels. A pipe O leads from one of the ports $N^2$ in the casing N to a central passage $O^1$ in a hollow plug P which is fixed within a casing $P^1$ enclosing the rotatable casing C. This plug P projects into the hollow end of the shaft member which carries the clutch disc $H^1$ and constitutes the end portion of the rotatable shaft H on which this member is mounted. The passage $O^1$ opens into a chamber $O^2$ formed in the end portion of the shaft H and from this chamber one or more radial passages $O^3$ lead into the space $G^x$. Through a pipe Q liquid can flow from within the casing N to an annular space $Q^1$ within the plug P and around the central passage $O^1$ and thence into an annular chamber $Q^2$ in the end portion of the shaft H and by way of one or more radial passages $Q^3$ into the annular space $H^x$.

From the casing N liquid can flow through the pipe R to a central passageway $R^1$ in a fixed plug S which lies in the end of the hollow shaft H. Thence the liquid can flow by way of a tube $S^1$ into a space formed by a transverse hole $R^2$ which runs through a plug $S^2$ in which is carried the one end of the tube $S^1$ so that this plug is not rotatable. From the space formed by this hole $R^2$ and an annular groove around its outer ends the liquid can flow by way of one or more radial passages leading into an annular groove $R^3$, formed in the exterior of the shaft H, by one or more radial passages $R^4$ thorugh the wall of the hollow shaft G into an annular groove $R^5$ within the hollow shaft J, whence one or more radial passages $R^6$ lead into the space $J^x$ between the partition $F^4$ and the clutch disc $J^1$. Finally liquid can flow by way of the pipe T into the annular space $T^1$ within the plug S and around the passageway $R^1$, and thence by one or more passages $T^2$ formed through the plug S into the space $T^3$ around the tube $S^1$. From here liquid can pass through one or more radial passages into an annular groove $T^4$ in the exterior of the shaft H and thence by way of one or more radial passages $T^5$ through the wall of the shaft G into an annular groove $T^6$ and by one or more radial passages $T^7$ into the space $K^x$ between the partition $F^4$ and the clutch disc $K^1$.

The changes in the transmission ratios in the driving of the two impellers are effected in the following way each impeller being driven at two different speeds which can be separately varied. The first clutch members to be engaged are the pair $E^2$, $G^2$ and the pair $F^3$, $K^2$. The first mentioned pair are brought into engagement by rotating the cock M into the position necessary to allow liquid to flow through the pipe O into the space $G^x$ with the result that the sliding annulus E and the partition $E^4$ will be moved to the right as shown in the drawings thereby bringing the clutch members $E^2$ and $G^2$ into engagement. This will couple the impeller A through its casing C to the shaft G and the pinion $G^3$ thereon which is driven by the gear wheel $L^3$ on the driving shaft L. Simultaneously liquid can flow from the cock M through the pipe T into the space $K^x$ thereby moving to the right the sliding annulus F owing to the action of the liquid on the partition $F^4$ and bringing into engagement the clutch members F³ K². In this way the impeller B will be coupled through its casing D to the shaft K with the pinion K³ thereon which is driven by the gear wheel L⁵ on the driving shaft L. Liquid will thus flow through the pipes O and T when the cock M is in an angular position 190° from the position in which it is shown in the drawing.

Secondly by rotation of the cock M liquid will be permitted to flow through the pipe Q to the space Hˣ thereby bringing into engagement the pair of clutch elements E³, H² which couple the impeller A through its casing C to the shaft H with the pinion H³ on the end thereof which is driven by the gear wheel L² on the driving shaft L. At the same time liquid will be permitted to flow through the pipe T as before into the space Kˣ so that while the speed at which the impeller A is driven has been altered the impeller B will continue to be driven at the same speed. This effect will be obtained when the cock M has been rotated from its last position into a position 90° from that in which it is shown in the drawing the ports which appear in that position then being brought into register with the ports in the wall of the casing N which will permit the liquid flow through the pipes Q and T.

The next change that occurs is to again permit the flow of liquid through the pipe O into the space Gˣ thereby once more coupling the impeller A to the shaft G through which it is driven from the driving gear wheel L³. In the case of the impeller B, however, liquid is now allowed to flow through the pipe R into the space Jˣ thus coupling this impeller B to the shaft J with the pinion J³ thereon which is driven by the gear wheel L⁴. This liquid flow will occur when the rotatable cock M is turned into the position in which it is shown in the drawings. The final change occurs when the cock M has been rotated further through 90° from the position in which it is shown in the drawings thereby permitting liquid to flow through the pipe Q into the space Hˣ and through the pipe R into the space Jˣ whereby the impeller B will be driven at the same speed but the speed of the impeller A will again be varied. In this position both impellers will be driven at their higher speeds.

In order to prevent the cock M from being rotated continuously in one direction without check and thus passing directly from what may be called its fourth position to its first position without passing back through the intermediate positions, there is on the spindle M² of the cock a radially projecting pin M³ which when the cock has been turned nearly through 360°, that is to say when it has passed from its first to its fourth main position, this pin will come in contact with a stop N³. To return the cock from its fourth position to its first position it is then necessary to reverse its direction of rotation and pass through the intermediate third and second positions.

When a gear change is made the pressure in the space at one side of a partition E⁴ or F⁴ is relieved as the pressure liquid is admitted to the other side of that partition. This relief is effected by leakage of the liquid through small passages or drain holes provided for the purpose, but not shown in the drawing. These passages permit the escape of liquid when the flow into the spaces on one side or the other of each partition is shut off.

What we claim as our invention and desire to secure by Letters Patent is:

1. In a variable speed transmission mechanism for the purpose indicated, the combination of a driving shaft on which are four gear wheels of different sizes, at least two impellers forming the separate stages of a supercharger, two coaxial shafts on which the impellers are respectively mounted, a set of two oppositely directed cone clutch members connected together and to the shaft of the one impeller, a second and similar set of two oppositely directed cone clutch members connected together and to the shaft of the second impeller, a hollow shaft which passes through both coaxial impeller shafts and carries on one end thereof a cone clutch member adapted to engage one of the clutch members in the first impeller set and has on the other end a pinion which meshes with one of the gear wheels on the said driving shaft, a second hollow shaft which rotates on the said first hollow shaft and like that shaft passes through both coaxial impeller shafts, this second shaft carrying on one end thereof a clutch member adapted to engage the second clutch member in the said first impeller set and having on the other end a pinion which meshes with the second of the gear wheels on the said driving shaft, a third hollow shaft which rotates on the said second driving shaft and carries on one end thereof a clutch member adapted to engage one of the clutch members in the said second impeller set and has on the other end a pinion which meshes with the third of the gear wheels on the said driving shaft, a fourth hollow shaft which rotates on the said third hollow shaft and carries on one end thereof a clutch member adapted to engage the second clutch member in the said second impeller set and has on the other end a pinion which meshes with the fourth of the gear wheels on the said driving shaft, and hydraulically actuated means for effecting the engagement and disengagement of the separate shaft clutch members and the impeller clutch members with which they cooperate.

2. In a variable speed transmission mechanism for the purpose indicated, the combination of a driving shaft on which are four gear wheels of different sizes, at least two impellers forming the separate stages of a supercharger, two coaxial shafts disposed adjacent and on which the impellers are respectively mounted, a set of two oppositely directed cone clutch members connected together and to the shaft of the one impeller, a second and similar set of two oppositely directed cone clutch members connected together and to the shaft of the second impeller, the impellers lying adjacent on their shafts with their associated first and second sets of clutch members disposed on opposite sides of the impellers, a hollow shaft which passes through both coaxial impeller shafts and carries on one end thereof a cone clutch member adapted to engage one of the clutch members in the first impeller set and has on the other end a pinion which meshes with one of the gear wheels on the said driving shaft, a second hollow shaft which rotates on the said first hollow shaft and like that shaft passes through both coaxial impeller shafts, this second shaft carrying on one end thereof a clutch member adapted to engage the second clutch member in the said first impeller set and having on the other end a pinion which meshes with the second of the gear wheels on the said driving shaft, a third hollow shaft which rotates on the said second driving shaft and carries on one end thereof a clutch member adapted to engage one of the clutch members in the said second impeller set and has on the other end a pinion which meshes with the third of the gear wheels on the said driving shaft, a fourth hollow shaft which rotates on the said third hollow shaft and carries on one end thereof a clutch member adapted to engage the second clutch member in the said second impeller set and has on the other end a pinion which meshes with the fourth of the gear wheels on the said driving shaft, and hydraulically actuated means for effecting the engagement and disengagement of the separate shaft clutch members and the impeller clutch members with which they cooperate.

3. In a variable speed transmission mechanism for the purpose indicated, the combination of a driving shaft on which are four gear wheels of different sizes, an impeller forming a stage of a multi-stage supercharger mounted on a shaft which carries a casing, two oppositely directed cone clutch members connected together and forming a set and carried by and rotating with this impeller casing, a second impeller forming antother stage of a multi-stage supercharger mounted on a shaft which carries a casing, two oppositely directed cone clutch members connected together and forming a second set and carried by and rotating with the second impeller casing, the two impeller shafts being mounted coaxial, a hollow shaft which passes through both coaxial impeller shafts and carries on one end thereof a cone clutch member adapted to engage one of the clutch members in the first impeller set and has on the other end a pinion which meshes with one of the gear wheels on the said driving shaft, a second hollow shaft which rotates on the said first hollow shaft and like that shaft passes through both coaxial impeller shafts, this second shaft carrying on one end thereof, a clutch member adapted to engage the second clutch member in the said first impeller set and having on the other end a pinion which meshes with the second of the gear wheels on the said driving shaft, a third hollow shaft which rotates on the said second hollow shaft and carries on one end thereof a clutch member adapted to engage one of the clutch members in the said second impeller set and has on the other end a pinion which meshes with the third of the gear wheels on the said driving shaft, a fourth hollow shaft which rotates on the said third hollow shaft and carries on one end thereof a clutch member adapted to engage the second clutch member in the said second impeller set and has on the other end a pinion which meshes with the fourth of the gear wheels on the said driving shaft, and hydraulically actuated means operative within the said impeller first and second casings to effect the engagement and disengagement of the separate shaft clutch members and the connected clutch members in those impeller casings with which these shaft clutch members cooperate.

4. In a variable speed transmission mechanism for the purpose indicated, the combination of a driving shaft on which are four gear wheels of different sizes, at least two impellers forming the separate stages of a supercharger, two coaxial shafts on which the impellers are respectively mounted, a set of two oppositely directed cone clutch members connected together and to the shaft of the one impeller, a second and similar set of two oppositely directed cone clutch members connected together and to the shaft of the second impeller, a hollow shaft which passses through both coaxial impeller shafts and carries on one end thereof a cone clutch member adapted to engage one of the clutch members in the first impeller set and has on the other end a pinion which meshes with one of the gear wheels on the said driving shaft, a second hollow shaft which rotates on the said first hollow shaft and like that shaft passes through both coaxial impeller shafts, this second shaft carrying on one end thereof a clutch member adapted to engage the second clutch member in the said first impeller set and having on the other end a pinion which meshes with the second of the gear wheels on the said driving shaft, a third hollow shaft which rotates on the said second hollow shaft and carries on one end thereof a clutch member adapted to engage one of the clutch members in the said second impeller set and has on the other end a pinion which meshes with the third of the gear wheels on the said driving shaft, a fourth hollow shaft which rotates on the said third hollow shaft and carries on one end thereof a clutch member adapted to engage the second clutch member in the said second impeller set and has on the other end a pinion which meshes with the fourth of the gear wheels on the said driving shaft, means by which the two connected clutch members in the first impeller set and the separate clutch members adapted to engage them can be moved relatively, means by which the two connected clutch members in the said second impeller set and the separate clutch members adapted to engage them can be moved relatively, and hydraulic means whereby is caused the respective relative movements of these clutch members.

5. In a variable speed transmission mechanism for the purpose indicated, the combination of a driving shaft on which are four gear wheels of different sizes, an impeller forming a stage of a multi-stage supercharger mounted on a shaft which carries a casing, two oppositely directed cone clutch members connected together and forming a set and carried by and rotating with this impeller casing, a second impeller forming another stage of a multi-stage supercharger mounted on a shaft which carries a casing, two oppositely directed cone clutch members connected together and forming a second set and carried by and rotating with the second impeller casing, the two impeller shafts being mounted adjacent and coaxial, a hollow shaft which passes through both coaxial impeller shafts and carries on one end thereof a cone clutch member adapted to engage one of the clutch members in the first impeller set and has on the other end a pinion meshing with one of the gear wheels on the said driving shaft, a second hollow shaft which rotates on the said first hollow shaft and like that shaft passes through both coaxial impeller shafts, this second shaft carrying on one end thereof a clutch member adapted to engage the second clutch member in the said first impeller set and having on the other end a pinion meshing with the second of the gear wheels on the said driving shaft, a third hollow shaft which rotates on the said second hollow shaft and carries on one end thereof a clutch member adapted to engage one of the clutch members in the said second impeller set and has on the other end a pinion meshing with the third of the gear wheels on the said driving shaft, a fourth hollow shaft which rotates on the said third hollow shaft and carries on one end thereof a clutch member adapted to engage the second clutch member in the said second impeller set and has on the other end a pinion which meshes with the fourth of the gear wheels on the said driving shaft, means by which the two connected clutch members in the first impeller set and the separate clutch members adapted to engage them can be moved relatively, means by which the two connected clutch members in the said second impeller set and the separate clutch members adapted to engage them can be moved relatively, and hydraulic means whereby is caused the respective relative movements of these clutch members.

6. In a variable speed transmission mechanism for the purpose indicated, the combination of a driving shaft on which are four gear wheels of different sizes, an impeller forming a stage of a multi-stage supercharger mounted on a shaft which carries a casing, an annulus within and so connected to this casing that it will rotate with the casing but can slide relatively to it in the direction of its axis, two oppositely directed cone clutch members forming a set and mounted on this annulus on opposite sides of an inwardly directed partition carried by the annulus, a second impeller forming another stage of a multi-stage supercharger mounted on a shaft which carries a casing, an annulus within and so connected to this casing that it will rotate with the casing but can slide relatively to it in the direction of its axis, two oppositely directed cone clutch members forming a set and mounted on this annulus on opposite sides of an inwardly directed partition carried by the annulus, the two impeller shafts being mounted adjacent and coaxial, a hollow shaft which passes through both coaxial impeller shafts and carries on one end thereof a disc with a cone clutch member adapted to engage the clutch member at one side of the partition in the annulus in the said first impeller casing this shaft having on the other end a pinion meshing with one of the gear wheels on the said driving shaft, a second hollow shaft which rotates on the said first hollow shaft and like that shaft passes through both coaxial impeller shafts, this second shaft carrying on one end thereof a disc with a cone clutch member adapted to engage the second clutch member at the other side of the partition in the annulus in the said first impeller casing and on the other end a pinion meshing with the second of the gear wheels on the said driving shaft, a third hollow shaft which rotates on the said second hollow shaft and carries on one end thereof a disc with a cone clutch member adapted to engage the clutch member at one side of the partitition in the annulus in the said second impeller casing this shaft having on the other end a pinion meshing with the third of the gear wheels on the said driving shaft, a fourth hollow shaft which rotates on the said third hollow shaft and carries on one end thereof a disc with a cone clutch member adapted to engage the second clutch member at the other side of the partition in the annulus in the second impeller casing this shaft having on the other end a pinion meshing with the fourth of the gear wheels on the said driving shaft, and hydraulic means operative on the partitions within the said first and second impeller casings to cause each annulus to slide and thereby effect the engagement and disengagement of the separate shaft clutch members and the clutch members carried by the annulus.

7. In variable speed transmission mechanism for the purpose indicated, the combinaton of a driving shaft on which are four gear wheels of different sizes, at least two impellers forming the separate stages of a supercharger, two coaxial shafts on which the impellers are respectively mounted, a set of two oppositely directed cone clutch members connected together and to the shaft of the one impeller, a second and similar set of two oppositely directed cone clutch members connected together and to the shaft of the second impeller, a hollow shaft which passes through both coaxial impeller shafts and carries on one end thereof a cone clutch member adapted to engage one of the clutch members in the first impeller set and has on the other end a pinion which meshes with one of the gear wheels on the said driving shaft, a second hollow shaft which rotates on the said first hollow shaft and like that shaft passes through both coaxial impeller shafts, this second shaft carrying on one end thereof a clutch member adapted to engage the second clutch member in the said first impeller set and having on the other end a pinion which meshes with the second of the gear wheels on the said driving shaft, a third hollow shaft which rotates on the said second driving shaft and carries on one end thereof a clutch member adapted to engage one of the clutch members in the said second impeller set and has on the other end a pinion which meshes with the third of the gear wheels on the said driving shaft, a fourth hollow shaft which rotates on the said third hollow shaft and carries on one end thereof a clutch member adapted to engage the second clutch member in the said second impeller set and has on the other end a pinion which meshes with the fourth of the gear wheels on the said driving shaft, hydraulical means for effecting the engagement and disengagement of the separate shaft clutch members and the clutch members in the impeller sets with which they cooperate, and a cock for selectively controlling these hydraulic means whereby each impeller can be driven at two different speeds.

FRANK BERNARD HALFORD.
BENJAMIN WILLIAM BARLOW.